(12) United States Patent
Morris et al.

(10) Patent No.: US 6,352,488 B1
(45) Date of Patent: Mar. 5, 2002

(54) POWER TRANSMISSION BELT

(75) Inventors: Matthew Thomas Morris; Wesley James Billups, both of Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/468,526

(22) Filed: Dec. 21, 1999

Related U.S. Application Data

(60) Provisional application No. 60/122,940, filed on Mar. 5, 1999.

(51) Int. Cl.[7] ................................................ F16G 5/04
(52) U.S. Cl. ........................................ 474/263; 474/260
(58) Field of Search ................................ 474/237, 260, 474/261, 262, 263, 264, 265

(56) References Cited

U.S. PATENT DOCUMENTS

| | | | |
|---|---|---|---|
| 4,747,812 A | | 5/1988 | Matsnoka et al. ........... 474/252 |
| 4,892,510 A | * | 1/1990 | Matsuoka et al. ........... 474/252 |
| 5,209,705 A | | 5/1993 | Gregg ........................ 474/204 |
| 5,238,991 A | * | 8/1993 | Mangus et al. ............. 524/520 |
| 5,421,789 A | | 6/1995 | Gregg ........................ 474/153 |
| 5,458,544 A | * | 10/1995 | Fujiwara et al. ............ 474/205 |
| 5,610,217 A | * | 3/1997 | Yarnell et al. .............. 524/397 |
| 5,861,212 A | * | 1/1999 | Mori et al. ................. 428/375 |

FOREIGN PATENT DOCUMENTS

| | | |
|---|---|---|
| EP | 0319320 | 12/1998 |
| EP | 1052425 | 11/2000 |
| GB | 2349113 | 4/1999 |

OTHER PUBLICATIONS

Patent Abstracts of Japan, vol. 1995, No. 9, dated Oct. 31, 1995; JP 07 151190.
Patent Abstracts of Japan, vol. 18, No. 408, dated Jul. 29, 1994; JP 06 117497.
European Search Report dated May 30, 2000; EP 0,010, 3773.

* cited by examiner

*Primary Examiner*—David A. Bucci
*Assistant Examiner*—Vicky A. Johnson
(74) *Attorney, Agent, or Firm*—Bruce J. Hendricks (57) ABSTRACT

An endless power transmission belt comprising
(a) a tension section;
(b) a cushion section;
(c) a load-carrying section disposed between said tension section and cushion section; and
(d) at least one drive surface having a fabric layer bonded to an outer surface of the belt, the improvement comprising a coating layer on said fabric layer of a composition containing a zinc salt unsaturated carboxylic acid ester grafted hydrogenated nitrile butadiene elastomer, a curing agent for said elastomer and from 5 to 60 phr of PTFE in the form of fibers, powder and mixtures thereof, dispersed throughout said composition.

17 Claims, 4 Drawing Sheets

FIG-4

POWER TRANSMISSION BELT

This application claims the benefit of U.S. Provisional Application 60/122,940 filed Mar. 5, 1999.

BACKGROUND OF THE INVENTION

Recent developments in the automotive industry have resulted in higher engine output in a more compact engine compartment. As a result, power transmission belts on these engines have been required to operate under high load, at high tensions and at high temperatures while reducing belt width. This environment demands a high quality belt capable of withstanding these severe conditions. One method to improve the properties of such belts has been to improve the materials from which the belts are made of. For example, conventional polychloroprene rubber has been replaced with hydrogenated nitrile rubber and chlorosulfonated polyethylene. In addition, solid lubricants have been added to the rubber composition to improve the abrasion properties of the belt by reducing the coefficient of friction.

SUMMARY OF THE INVENTION

The present invention relates to a power transmission belt that is characterized by a fabric coating on the drive surface which reduces the coefficient of friction and minimizes wear.

BRIEF DESCRIPTION OF THE FIGURES

The accompanying figures show embodiments of this invention in which.

DETAILED DESCRIPTION OF THE INVENTION

There is disclosed an endless power transmission belt comprising
(a) a tension section;
(b) a cushion section;
(c) a load-carrying section disposed between said tension section and cushion section; and
(d) at least one drive surface having a fabric layer bonded to an outer surface of the belt, the improvement comprising a coating layer on said fabric layer of a composition containing a zinc salt unsaturated carboxylic acid ester grafted hydrogenated nitrile butadiene elastomer, a curing agent for said elastomer and from 5 to 60 phr of PTFE in the form of fibers, powder and mixtures thereof, dispersed throughout said composition.

Figure 1:
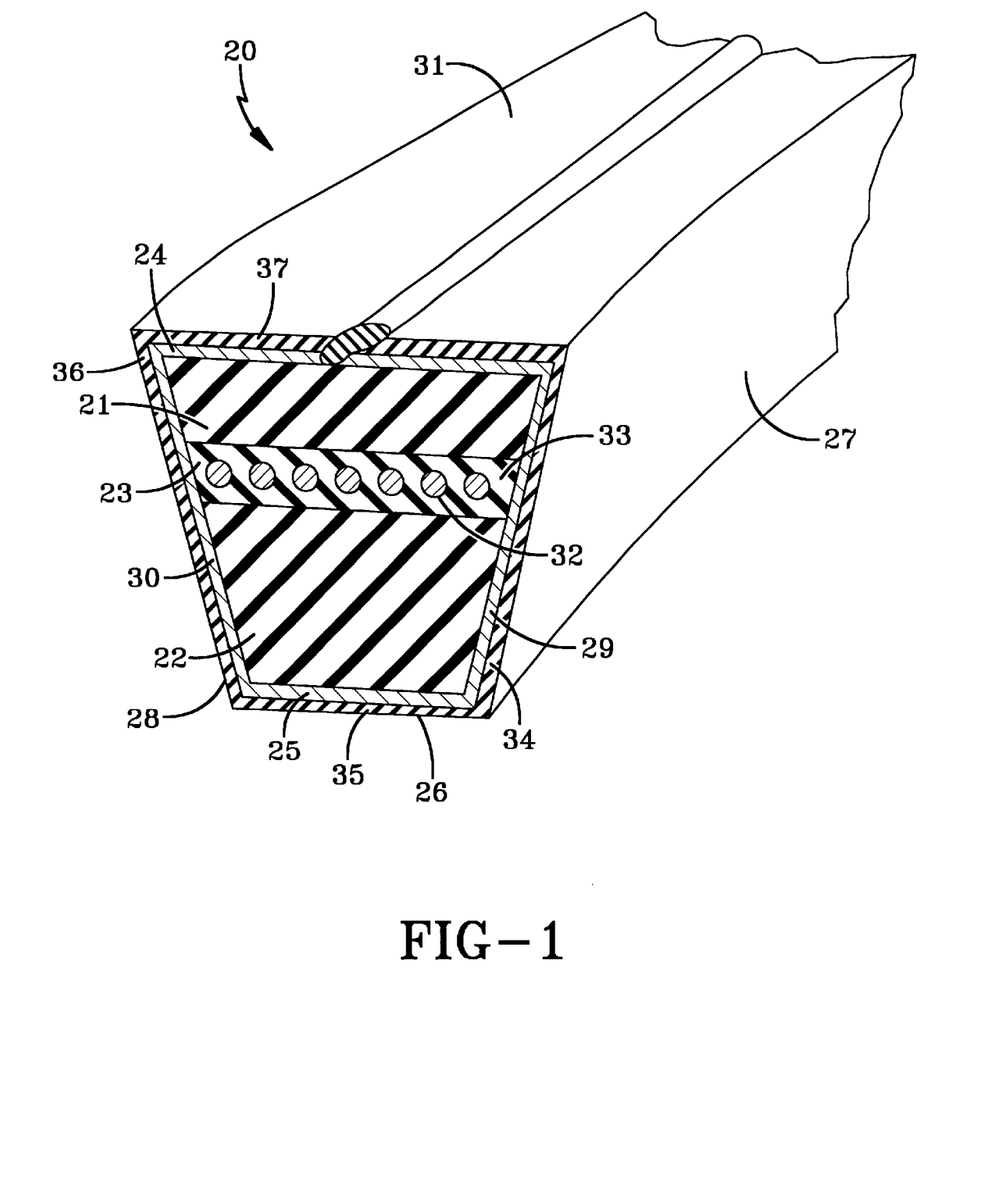
FIG. 1 is a fragmentary perspective view illustrating one embodiment of an endless power transmission belt of this invention.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in automotive applications. The belt 20 is particularly adapted to be used in so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 22 and a load-carrying section 23 disposed between the tension section 21 and cushion section 22. The belt 20 also has an inside ply or inner fabric layer 25 (adhered to drive surface) and an optional outside ply or outer fabric layer 24 (adhered to non-drive surface).

In the belts of the present invention, there is at least one drive surface having a fabric layer bonded to the outer surface. In the embodiment shown in FIG. 1, there are three drive surfaces 26, 27 and 28, each having a fabric layer 25, 29 and 30. As an optional aspect, non-driving surfaces 31 may also have a fabric layer 24.

Each fabric layer 24, 25, 29 and 30 may be made from a bi-directional, non-woven, woven or knitted fabric; and each fabric layer 24, 25, 29 and 30 is frictioned, spread or coated with an elastomeric material which is selected to assure the layer is bonded to its associated section in a tenacious manner.

The fabrics for use in the present invention are made of conventional materials including nylon (such as nylon 4,6, nylon 6,6 and nylon 6), cotton, polyester, cotton/polyester, nylon/polyester, cotton/nylon, Lycra™ (segmented polyurethane), aramid, rayon, and the like. Preferably, the fabric is made of nylon 6,6.

As described later, the coating composition 34, 35 and 36 is applied to the fabric layer 25, 29 and 30 of a drive surface 26, 27 and 28. In accordance with another embodiment, the coating composition 37 may be applied to the fabric layer 24 of a non-drive surface 31 in the same manner described herein for use on the fabric layer 25, 29 and 30 of a drive surface 26, 27 and 28.

The load-carrying section 23 has load-carrying means in the form of load-carrying cords 32 or filaments which are suitably embedded in an elastomeric cushion or matrix 33 in accordance with techniques which are well known in the art. The cords 32 or filaments may be made of any suitable material known and used in the art. Representative examples of such materials include aramids, fiberglass, nylon, polyester, cotton, steel, carbon fiber and polybenzoxazole.

The drive surface 26, 27 and 29 of the belt 20 of FIG. 1 is smooth. In accordance with other embodiments and as discussed later, it is contemplated herein the belts of the present invention also include those belts where the drive surface of the belt may be single V-grooved, multi-V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The rubber compositions for use in the tension section 21 and cushion section 22 may be the same or different. Conventional elastomers which may be used in one or both of these sections include natural rubber, polychloroprene, acrylonitrile-butadiene copolymers (NBR), polyisoprene, zinc salts of unsaturated carboxylic acid ester grafted hydrogenated nitrile butadiene elastomers, styrene-butadiene rubbers, polybutadiene, EPDM, hydrogenated acrylonitrile-butadiene copolymers (HNBR), polyurethane, elastomers marketed under the Viton™ designation and ethylene-acrylic elastomers sold under the name VAMAC and blends thereof.

Figure 2:
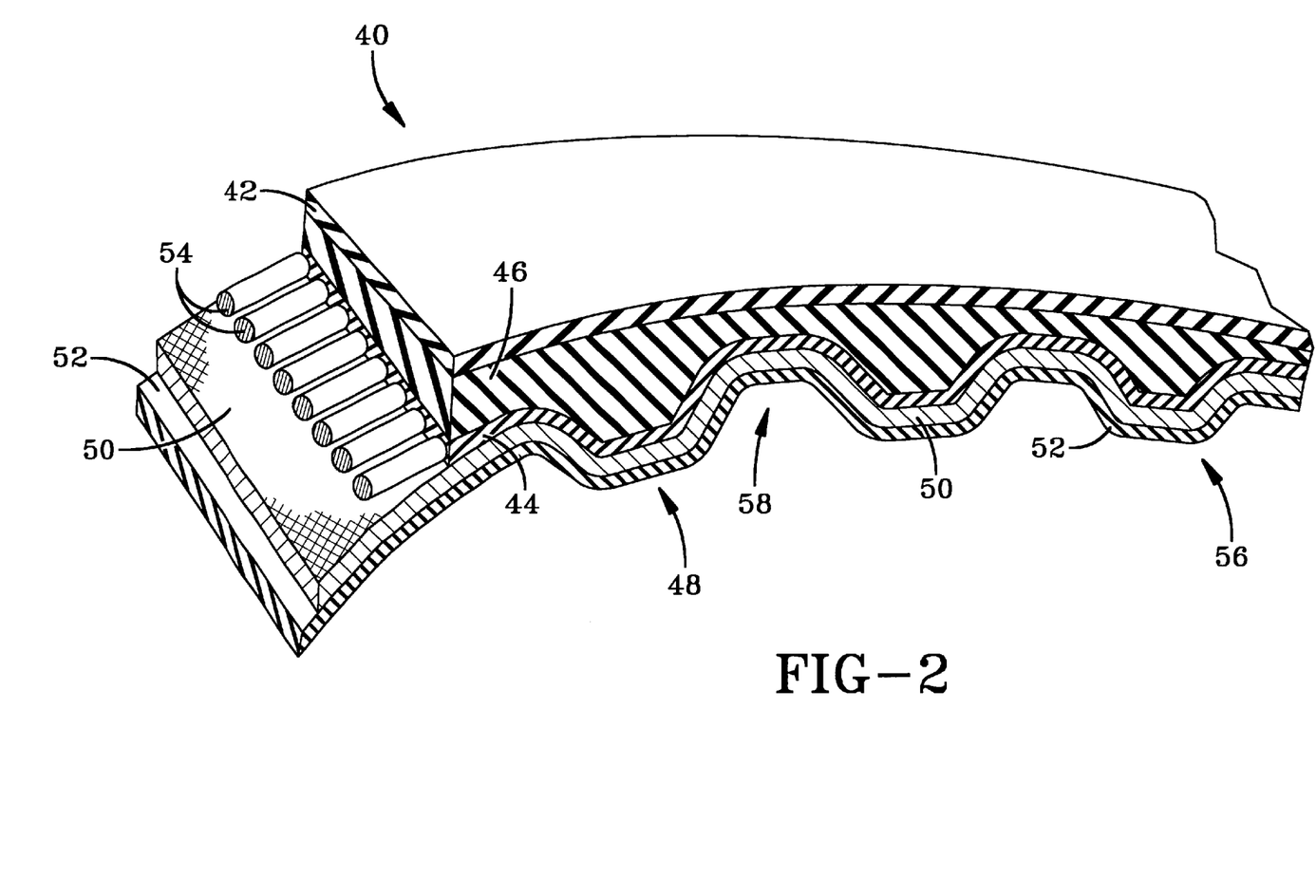
FIG. 2 is a fragmentary perspective view illustrating one embodiment of an endless power transmission belt of this invention.

Referring to FIG. 2, an endless power transmission belt according to another embodiment is shown at 40. Similar to the belt 20 of FIG. 1, the belt 40 comprises a tension section 42, a cushion section 44 and a load-carrying section 46.

In the belt of FIG. 2, there is one drive surface having a fabric layer 50 bonded to the outer surface. Onto the fabric layer 50 is the coating layer 52 discussed below.

The load-carrying section 46 has load-carrying means in the form of load-carrying cords or filaments 54 as discussed above.

In the embodiment shown in FIG. 2, the belt 40 has a series of spaced cogs or teeth 56 and alternating land portions 58 of the belt 40.

The composition for use as a coating layer on the fabric of the drive surface contains a zinc salt unsaturated carboxylic acid ester grafted hydrogenated nitrile butadiene elastomer (ZnHNBR). The zinc salt carboxylic acid ester grafted hydrogenated nitrile butadiene elastomer can be any of the zinc salt carboxylic acid ester grafted hydrogenated nitrile butadiene elastomers sold by Zeon Chemicals, Inc, Rolling Meadows, Ill., under any of the following product designations: ZSC 1295, ZSC 2095, ZSC 2195, ZSC 2295, ZSC 2295L, ZSC 2295R and ZSC 2395; most preferably, ZSC 2295 having a Mooney viscosity of about 88, about 10 percent unsaturation and an acrylonitrile content of about 36 percent and ZSC 2295L having a Mooney viscosity of about 70, about 10 percent unsaturation and an acrylonitrile content of about 36 percent.

The composition for the coating of the fabric contains from 5 to 60 phr of PTFE or Teflon®. The PTFE may be in the form of a powder, fiber, flock or mixtures thereof. Such fibers or flock are commercially available having an average length of one sixty-fourth inch (0.4 mm) and a denier (per filament) of 6.7. PTFE powders are commercially available from numerous sources, including Daikin Kogyo Co Ltd under the designation Polyfron™ F103, DuPont under the designation DLX-600 and Alphaflex Industries, Inc. Typical PTFE powders or particles have diameters ranging from 100 to 600 microns.

The PTFE powder or fiber may be present in various levels in the composition used for the coating layer. Generally speaking, the level of flock will range from 5 to 60 parts per weight per 100 parts by weight of rubber (phr) in the composition. Preferably, the PTFE is present in an amount ranging from 15 to 40 phr.

The elastomeric compositions for use in the coating layer can be crosslinked by various peroxide containing curing agents. Curing agents which may be employed in the compositions of the invention include, for example, di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate and n-butyl-4,4-bis(t-butyl peroxy) valerate. Additional curing agents which may be employed include diacyl or dialkyl peroxides such as $\alpha,\alpha'$-bis(t-butylperoxy)-isopropylbenzene, 2,5-Dimethyl-2,5-di(t-butylperoxy) hexane, Di-t-butyl peroxide, 2,5-Dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di (benzoylperoxy)-hexane and benzoyl peroxide. All of the above curing agents are commercially available.

The amount of curing agent that is used may vary. Generally speaking, the level will range of from 0.1 to 10 phr (based on active parts of peroxide) Preferably, the level ranges from 1.8 to 3.0 phr.

Minor amounts of the zinc salt unsaturated carboxylic acid ester grafted hydrogenated nitrile butadiene elastomer may be substituted with conventional hydrogenated acrylonitrile butadiene rubbers. For example, from 0 to 30 parts by weight of the total 100 parts by weight of the composition may be HNBR. Of course in such instances, the level of HNBR will range from 70 to 100 parts by weight of the composition.

Various hydrogenated acrylonitrile butadiene rubbers may be used. For example, the Mooney viscosity (M/L 1+4 @ 100° C.) and the acrylonitrile content may vary depending on the use of the belt. Suitable examples of hydrogenated acrylonitrile butadiene rubber may have a Mooney viscosity as low as 60 to as high as 120. The acrylonitrile content may range from as low as 15 percent to as high as 60 percent. The residual double bonds may range from 0 to 20 percent. Representative acrylonitrile rubbers that are commercially available from Nippon Zeon Company include a family of products marketed under the Zetpol™ line, such as Zetpol™ 1020 (Mooney 78 and acrylonitrile content 45 percent), Zetpol™ 2010 (Mooney 85 and acrylonitrile content 37 percent) and Zetpol™ 2020 (Mooney 78 and acrylonitrile content 37 percent). Another family of commercially available hydrogenated acrylonitrile-butadiene rubbers are marketed under the designation Therban™ by Bayer. Representative examples of various grades of the Therban™ line include Therban™ C 3446 (acrylonitrile content 34 wt percent, 58 Mooney viscosity and 4 percent residual double bonds), Therban™ C 3467 (acrylonitrile content 34 percent, 68 Mooney viscosity, 5.5 percent residual double bonds), Therban™ B 3850 (acrylonitrile content 36 percent, 87 Mooney viscosity and 2 percent residual double bonds), Therban™ XO 534B (acrylonitrile content 36 percent, 66 Mooney viscosity, 2 percent residual double bonds), Therban™ C 4550 (acrylonitrile content 43 percent, 95 Mooney viscosity and 5.5 percent residual double bonds) and Therban™ XIV 532C (acrylonitrile content 43 percent, 70 Mooney viscosity and 5.5 percent residual double bonds).

An optional but yet desirable ingredient in the coating composition is conductive carbon black. Among the various types of carbon blacks available, acetylene blacks and selected grades of furnace blacks produced from oil feed stocks are the types which are recognized by practitioners in rubber compounding as conductive carbon blacks. The degree of electrical conductivity of a carbon black-loaded rubber depends on a number of factors including the number of conductive paths provided by the black and the resistance of the carbon black particles. The chain structure and the level of combined oxygen present at the surface of the carbon black particles are factors that affect the conductivity of a particular type of carbon black. High chain structure, low oxygen carbon blacks are generally efficient conductors. A commonly used method of classifying the conductive character of a cured rubber composition is to measure the electrical resistivity (ohms-cm) of the rubber composition. For the purposes of this invention, a carbon black is considered conductive if it exhibits electrical resistivity of less than $10^6$ ohms-centimeter when incorporated in the rubber at the desired level with all other compound ingredients. Currently available carbon blacks which exhibit such resistivity include conductive acetylene blacks available from Chevron Chemical Company and Denka, conductive furnace blacks available from Cabot Corporation, ketjen black available from Akzo. The most preferred carbon black is the Blackpearls 2000 from Cabot Corp. These carbon blacks exhibit an iodine number of 1050 g/kg +/− 60 and a dibutylphthlate (DBP) absorption range of about 330 +/− 30 cc/100 g. The conductive carbon black may be added to the coating composition at levels of from about 10 to about 50 parts by weight per 100 parts by weight of rubber (phr).

In addition to the above, solid inorganic lubricants may be present in the coating composition. Many times, such solid lubricants are dispersed with the PTFE. Representative examples of such lubricants include molybdenum disulfide, molybdenum diselenide, graphite, antimony trioxide, tungsten disulfide, talc, mica, tungsten diselenide and mixtures thereof. The amount of such solid inorganic lubricants, if used, will generally range from 1 to 25 phr.

The coating composition can be mixed conventionally in an internal mixer (eg, a Banbury mixer) with all of the ingredients being added initially, if so desired. They can also be mixed on an open mill in a conventional manner with the elastomer being first fluxed on the mill followed by the addition of the other non-curative ingredients and then followed by the cure package. The composition is then ready for further processing, such as calendering into a sheet form and application onto the fabric of the power transmission belt.

The coating composition may be applied to the fabric in a number of means. For example, calendering onto the fabric, calendering onto a transfer media and thereafter thermally transferring onto the fabric, solvating and spreading or spraying onto the fabric or transfer media.

The coating composition may be applied to the fabric of the belt in a variety of levels. The amount of coating composition may range from 0.05 kg/m$^2$ to 1.0 kg/M$^2$. The preferred level ranges from about 0.1 kg/m$^2$) to 0.5 kg/M$^2$.

EXAMPLE

A series of rubber samples were prepared to compare and contrast the properties of the coating compositions for use in the present invention. The components constituting the rubber compositions shown in Table I were mixed in a mill for approximately 3 minutes, followed by kneading the rubber composition with the peroxide on a milling roll. All parts listed in Table I are parts by weight. The various compositions were formed into test specimens and tested for numerous properties shown in Table II. Samples 1–7 are controls due to the absence of any PTFE and Samples 8–20 are considered representative of the coating compositions for use in the present invention.

TABLE I

| Sample | Control #1 | Control #2 | Control #3 | Control #4 | Control #5 | Control #6 | Control #7 |
|---|---|---|---|---|---|---|---|
| ZnHNBR[1] | 100 | 100 | 100 | 100 | 100 | 100 | 100 |
| PTFE Flock[2] | | | | | | | |
| PTFE Powder[3] | | | | | | | |
| PTFE Powder[4] | | | | | | | |
| Acetylene Carbon Black | | | | 10 | 30 | | |
| Graphite | | 10 | 30 | | | | |
| Molybdenum disulfide | | | | | | 10 | 30 |
| Carbon Black[5] | | | | | | | |
| Carbon Black[6] | | | | | | | |
| Conductive Carbon Black[7] | | | | | | | |
| Peroxide[8] | 4.5 | 4.5 | 4.5 | 4.5 | 4.5 | 4.5 | 4.5 |
| Peroxide[9] | | | | | | | |
| Peroxide[10] | | | | | | | |
| Peroxide[11] | | | | | | | |
| | 104.5 | 114.5 | 134.5 | 114.5 | 134.5 | 114.5 | 134.5 |

| Sample | #8 | #9 | #10 | #11 | #12 | #13 | #14 |
|---|---|---|---|---|---|---|---|
| ZnHNBR[1] | 100 | 100 | 100 | 100 | 100 | 100 | 100 |
| PTFE Flock[2] | 10 | 30 | 30 | 30 | 30 | 30 | 30 |
| PTFE Powder[3] | | | | | | | |
| PTFE Powder[4] | | | | | | | |
| Acetylene Carbon Black | | | | | | | |
| Graphite | | | | | | | |
| Molybdenum disulfide | | | | | | | |
| Carbon Black[5] | | | | | | | 2 |
| Carbon Black[6] | | | 15 | 20 | | | |
| Conductive Carbon Black[7] | | | | | 15 | 20 | |
| Peroxide[8] | 4.5 | 4.5 | 4.5 | 4.5 | 4.5 | 4.5 | 4.5 |
| Peroxide[9] | | | | | | | |
| Peroxide[10] | | | | | | | |
| Peroxide[11] | | | | | | | |
| | 114.5 | 134.5 | 149.5 | 154.5 | 149.5 | 154.5 | 136.5 |

| Sample | #15 | #16 | #17 | #18 | #19 | #20 |
|---|---|---|---|---|---|---|
| ZnHNBR[1] | 100 | 100 | 100 | 100 | 100 | 100 |
| PTFE Flock[2] | 30 | 30 | 30 | | | |
| PTFE Powder[3] | | | | | 2 | |
| PTFE Powder[4] | | | | 30 | 30 | 75 |
| Acetylene Carbon Black | | | | | | |
| Graphite | | | | | | |
| Molybdenum disulfide | | | | | | |
| Carbon Black[5] | 2 | 2 | 2 | 5 | | 10 |

TABLE I-continued

| | | | | | | | |
|---|---|---|---|---|---|---|---|
| Carbon Black[6] | | | | | | | |
| Conductive Carbon Black[7] | | | | | | 10 | |
| Peroxide[8] | | | | | 4.5 | 4.5 | 4.5 |
| Peroxide[9] | 5.8 | | | | | | |
| Peroxide[10] | | 7.7 | | | | | |
| Peroxide[11] | | | 6.2 | | | | |
| | 137.8 | 139.7 | 138.2 | 139.5 | 146.5 | 189.5 | |

[1]Obtained from Zeon Chemicals, Inc, under the designation ZSC 2295L.
[2]1/64 inch (0.4 mm) PTFE flock
[3]Obtained from Alphaflex Industries, Inc, under the designation Alphaflex 202. Product contains 75 percent by weight PTFE and 25 percent by weight molybdenum disulfide.
[4]Obtained from Alphaflex Industries and contains 90 percent by weight PTFE and 10 percent by weight molybdenum disulfide.
[5]N550
[6]Ketjenblack EC 300J obtained from Akzo.
[7]Black Pearls 2000 obtained from Cabot Corporation.
[8]$\alpha,\alpha'$-bis(t-butylperoxy)diisopropylbenzene (60 percent active) obtained under the designation Polydispersion VC-60 from Rheinchemie Corporation.
[9]2,5-dimethyl-2,5-di(t-butylperoxy)hexyne-3 (45 percent active) obtained under the designation Varox ™ 130-XL from R T Vanderbilt Company Inc.
[10]$\alpha,\alpha'$-bis(t-butylperoxy)diisopropylbenzene on clay (40 percent active) obtained as Varox ™ 802-40KE-HP from R T Vanderbilt Company Inc.
[11]2,5-dimethyl-2,5-di(t-butylperoxy)hexyne-3 on mineral binder (50 percent active) obtained as Varox ™ DBPH-50-HP from R T Vanderbilt Company Inc.

TABLE II

| Sample | Control #1 | Control #2 | Control #3 | Control #4 | Control #5 | Control #6 | Control #7 |
|---|---|---|---|---|---|---|---|
| MDR 8'/176.7° C. | | | | | | | |
| Test Temp (° C.) | 176.7 | 176.7 | 176.7 | 176.7 | 176.7 | 176.7 | 176.7 |
| Test Time (min) | 8.00 | 8.00 | 8.00 | 8.00 | 8.00 | 8.00 | 8.00 |
| S' min (dNm) | 2.28 | 2.28 | 2.89 | 3.30 | 7.22 | 4.51 | 4.70 |
| S' max (dNm) | 175.22 | 179.51 | 212.86 | 192.35 | 218.36 | 170.57 | 165.61 |
| $Ts_1$ (min) | 0.26 | 0.25 | 0.22 | 0.23 | 0.19 | 0.10 | 0.10 |
| $T_{90}$ (min) | 3.92 | 4.05 | 4.10 | 3.86 | 3.95 | 3.67 | 3.87 |
| S' @ $T_{90}$ (dNm) | 157.93 | 161.79 | 191.86 | 173.45 | 197.25 | 153.96 | 149.52 |
| Max Rate (dNm/min) | 186.08 | 190.25 | 250.98 | 225.38 | 380.22 | 382.70 | 339.18 |
| RPA Temperature Sweep 100.0 cpm/1.00° arc | | | | | | | |
| tan delta @ 82° C. | 0.664 | 0.668 | 0.680 | 0.641 | 0.563 | 0.642 | 0.664 |
| tan delta @ 93° C. | 0.766 | 0.781 | 0.797 | 0.727 | 0.702 | 0.745 | 0.762 |
| tan delta @ 104° C. | 0.876 | 0.905 | 0.926 | 0.831 | 0.777 | 0.863 | 0.875 |
| tan delta @ 116° C. | 0.975 | 1.018 | 1.047 | 0.928 | 0.836 | 0.992 | 0.982 |
| tan delta @ 127° C. | 1.050 | 1.093 | 1.121 | 0.979 | 0.791 | 1.051 | 0.996 |
| tan delta @ 132° C. | 0.983 | 1.011 | 1.034 | 0.859 | 0.700 | 0.841 | 0.835 |
| tan delta @ 138° C. | 0.663 | 0.702 | 0.756 | 0.606 | 0.620 | 0.609 | 0.655 |
| tan delta @ 149° C. | 0.434 | 0.455 | 0.502 | 0.411 | 0.514 | 0.434 | 0.467 |
| tan delta @ 160° C. | 0.245 | 0.254 | 0.278 | 0.244 | 0.398 | 0.255 | 0.275 |
| tan delta @ 171° C. | 0.154 | 0.155 | 0.173 | 0.166 | | 0.153 | 0.170 |
| Disk Abrasion (1.5 hours) T90 + 15 min @ 176.7° C. | | | | | | | |
| Before Wt (g) | 8.769 | 10.521 | 10.787 | 9.818 | 10.052 | 10.532 | 10.866 |
| After Wt (g) | 8.644 | 10.319 | 10.519 | 9.500 | 9.756 | 10.408 | 10.739 |
| % Loss (%) | 1.43 | 1.92 | 2.48 | 3.24 | 2.94 | 1.18 | 1.17 |
| Sample | #8 | #9 | #10 | #11 | #12 | #13 | #14 |
| MDR 8'/176.7° C. | | | | | | | |
| Test Temp (° C.) | 176.7 | 176.7 | 176.7 | 176.7 | 176.7 | 176.7 | 176.7 |
| Test Time (min) | 8.00 | 8.00 | 8.00 | 8.00 | 8.00 | 8.00 | 8.00 |
| S' min (dNm) | 2.31 | 2.76 | 8.02 | 11.22 | 12.21 | 21.88 | 3.06 |
| S' max (dNm) | 167.51 | 156.09 | 188.59 | 189.31 | 193.86 | 199.58 | 176.28 |
| $Ts_1$ (min) | 0.25 | 0.22 | 0.22 | 0.15 | 0.24 | 0.23 | 0.27 |
| $T_{90}$ (min) | 3.98 | 3.92 | 3.44 | 3.49 | 3.23 | 3.16 | 3.98 |
| S' @ $T_{90}$ (dNm) | 150.99 | 140.76 | 170.53 | 171.50 | 175.70 | 181.81 | 158.86 |
| Max Rate (dNm/min) | 167.02 | 184.73 | 237.80 | 281.17 | 231.90 | 256.10 | 198.52 |
| RPA Temperature Sweep | | | | | | | |

TABLE II-continued

| 100.0 cpm/1.00° arc | | | | | | | |
|---|---|---|---|---|---|---|---|
| tan delta @ 82° C. | 0.693 | 0.754 | 0.549 | 0.685 | 0.693 | 0.648 | 0.739 |
| tan delta @ 93° C. | 0.784 | 0.888 | 0.645 | 0.683 | 0.696 | 0.603 | 0.838 |
| tan delta @ 104° C. | 0.885 | 1.000 | 0.766 | 0.705 | 0.725 | 0.682 | 0.935 |
| tan delta @ 116° C. | 0.976 | 1.098 | 0.859 | 0.741 | 0.748 | 0.742 | 1.025 |
| tan delta @ 127° C. | 1.049 | 1.175 | 0.881 | 0.763 | 0.763 | 0.749 | 1.094 |
| tan delta @ 132° C. | 0.985 | 0.957 | 0.776 | 0.682 | 0.706 | 0.720 | 1.065 |
| tan delta @ 138° C. | 0.698 | 0.689 | 0.627 | 0.599 | 0.618 | 0.695 | 0.840 |
| tan delta @ 149° C. | 0.449 | 0.508 | 0.509 | 0.503 | 0.531 | 0.633 | 0.528 |
| tan delta @ 160° C. | 0.239 | 0.298 | 0.366 | 0.369 | 0.379 | 0.494 | 0.278 |
| tan delta @ 171° C. | 0.147 | 0.170 | 0.256 | | 0.265 | 0.347 | 0.181 |
| Disk Abrasion (1.5 hours) T90 + 15 min @ 176.7° C. | | | | | | | |
| Before Wt (g) | 9.832 | 11.523 | 12.053 | 11.766 | 11.985 | 11.232 | 10.363 |
| After Wt (g) | 9.784 | 11.519 | 11.942 | 11.589 | 11.890 | 11.009 | 10.361 |
| % Loss (%) | 0.49 | 0.03 | 0.92 | 1.50 | 0.79 | 1.99 | 0.02 |

| Sample | #15 | #16 | #17 | #18 | #19 | #20 |
|---|---|---|---|---|---|---|
| MDR 8'/176.7° C. | | | | | | |
| Test Temp (° C.) | 176.7 | 176.7 | 176.7 | 176.7 | 176.7 | 176.7 |
| Test Time (min) | 8.00 | 8.00 | 8.00 | 8.00 | 8.00 | 8.00 |
| S' min (dNm) | 2.71 | 2.53 | 2.57 | 2.67 | 11.08 | 4.11 |
| S' max (dNm) | 157.68 | 167.53 | 143.77 | 196.29 | 131.79 | 231.33 |
| $Ts_1$ (min) | 0.32 | 0.37 | 0.39 | 0.26 | 0.27 | 0.09 |
| $T_{90}$ (min) | 5.49 | 4.42 | 4.29 | 3.87 | 3.15 | 3.50 |
| S' @ $T_{90}$ (dNm) | 142.18 | 151.03 | 129.65 | 176.93 | 119.72 | 208.61 |
| Max Rate (dNm/min) | 171.93 | 178.65 | 155.05 | 267.33 | 228.42 | 354.78 |
| RPA Temperature Sweep 100.0 cpm/1.00° arc | | | | | | |
| tan delta @ 82° C. | 0.759 | 0.765 | 0.811 | 0.764 | 0.675 | 0.838 |
| tan delta @ 93° C. | 0.856 | 0.859 | 0.905 | 0.833 | 0.702 | 0.841 |
| tan delta @ 104° C. | 0.961 | 0.956 | 1.002 | 0.937 | 0.743 | 0.886 |
| tan delta @ 116° C. | 1.064 | 1.051 | 1.099 | 1.035 | 0.784 | 0.941 |
| tan delta @ 127° C. | 1.147 | 1.132 | 1.179 | 1.111 | 0.822 | 0.971 |
| tan delta @ 132° C. | 1.156 | 1.131 | 1.178 | 1.065 | 0.795 | 0.892 |
| tan delta @ 138° C. | 1.090 | 1.063 | 1.141 | 0.800 | 0.678 | 0.648 |
| tan delta @ 149° C. | 0.947 | 0.920 | 1.040 | 0.488 | 0.480 | 0.421 |
| tan delta @ 160° C. | 0.509 | 0.517 | 0.700 | 0.261 | 0.268 | 0.244 |
| tan delta @ 171° C. | 0.262 | 0.181 | 0.224 | 0.180 | | |
| Disk Abrasion (1.5 hours) T90 + 15 min @ 176.7° C. | | | | | | |
| Before Wt (g) | 11.002 | 10.839 | 9.985 | 12.352 | 13.008 | 14.905 |
| After Wt (g) | 11.002 | 10.831 | 9.976 | 12.253 | 12.524 | 14.838 |
| % Loss (%) | 0.00 | 0.07 | 0.09 | 0.80 | 3.72 | 0.45 |

Disk Abrasion

Disk Abrasion is a measure of the abrasion resistance of a rubber compound. Each test specimen is cylindrical in shape (19 mm in diameter and 25.4 mm in height). Each specimen is placed against a smooth surfaced rotating metal disc. The sample is loaded with 18.1 Kg of weight. After a given time, the weight of the rubber sample is measured and subtracted from the original weight of the sample.

Figure 3:
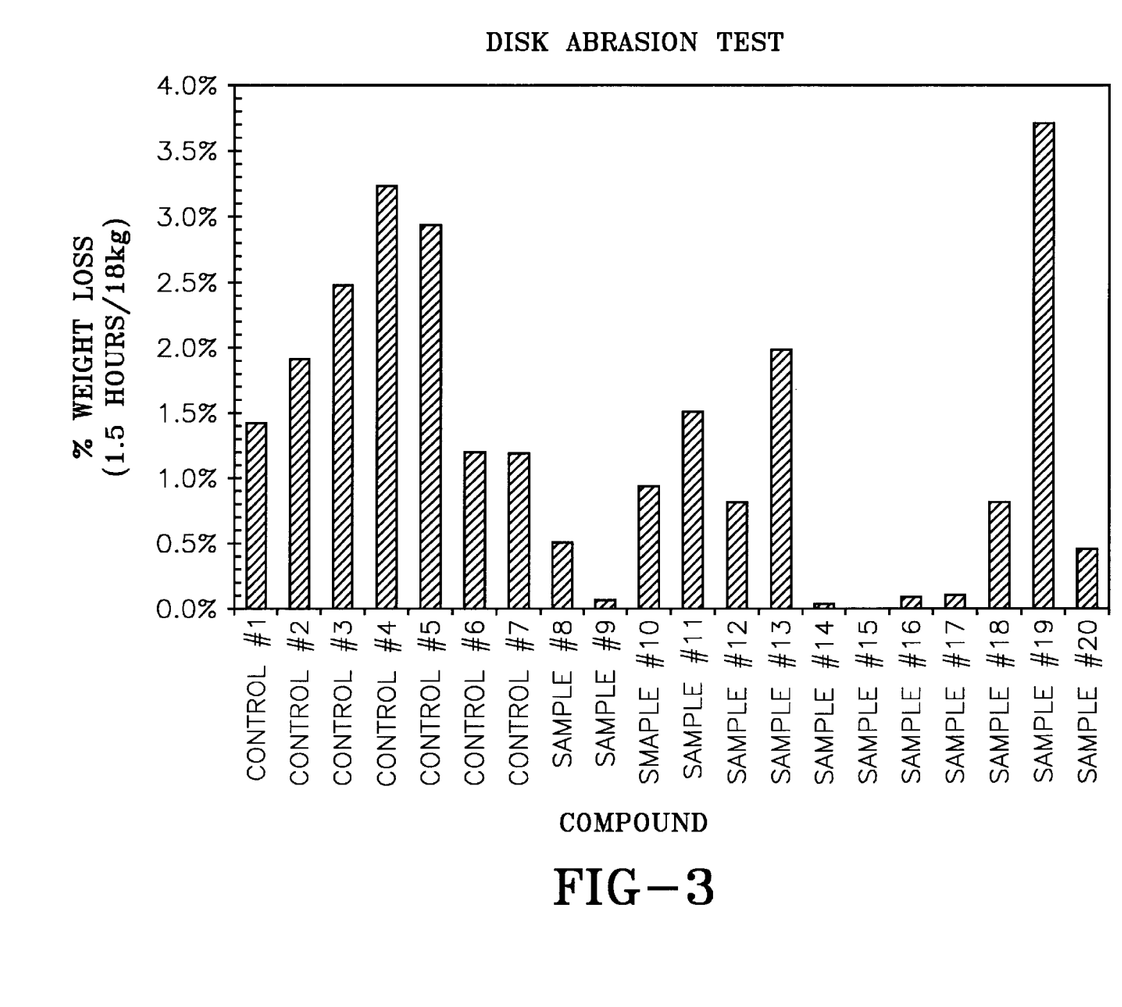
FIG. 3 is a graphic illustration of Disk Abrasion values from Table II.

FIG. 3 is a graphic illustration of the relative abrasion resistance of each compound. Compounds with 30 phr PTFE (Samples 9–17) show an advantage over those without any PTFE (Controls 1–7). The addition of carbon black reduces the abrasion resistance of the compounds with 30 phr PTFE (Samples 10–13). For aesthetic reasons, a small amount of carbon black is preferred (Samples 14–17).

The addition of the lubricants and fillers (ie, molybdenum disulfide, graphite and acetylene carbon black) reduce the abrasion resistance of the compound at high levels. At lower levels, these materials improve the processability of the compounds without reducing the abrasion resistance.

Tan delta

Figure 4:
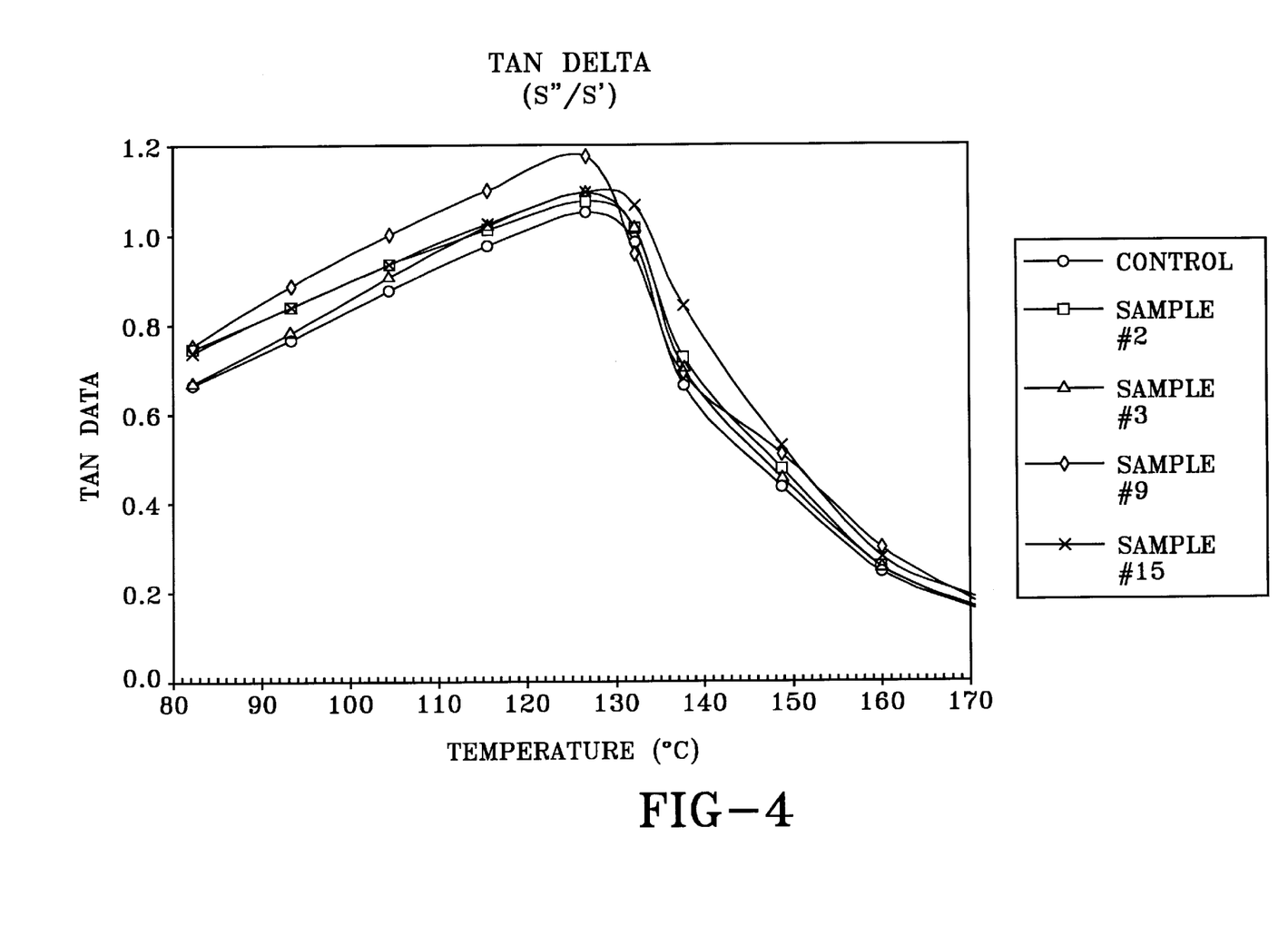
FIG. 4 is a graphic illustration of Tan Delta values for Control Sample 1, Control Sample 4, Control Sample 5, Sample 9 and Sample 11.

Tan delta is a measure of the viscous over elastic modulus. Therefore, samples with a high tan delta should mold more easily than those with a lower tan delta. Since many power transmission belts are prepared by molding the rubber during cure, this is another important property of the compound. FIG. 4 shows that increasing the amount of PTFE does not change the tan delta at the same rate as increasing the amount of carbon black, molybdenum disulfide or graphite. This is evident when comparing the maximum tan delta value compounds. Control 1 (0 phr carbon black and 0 phr PTFE) has a tan delta of 1.050 at 127° C. while Control 5 (30 phr carbon black and 0 phr PTFE) has a tan delta of 0.791 at 127° C. Sample 9 (0 phr carbon black and 30 phr PTFE) has a tan delta of 1.175 at 127° C. By changing the type of cure system used, the flow temperatures can be increased but the relative results should remain the same.

While present exemplary embodiments of this invention and methods of practicing the same have been illustrated and described, it will be recognized that this invention may be otherwise variously embodied and practiced within the scope of the following claims.

What is claimed is:

1. An endless power transmission belt comprising
   (a) a tension section;
   (b) a cushion section;
   (c) a load-carrying section disposed between said tension section and compression section; and
   (d) at least one drive surface having a fabric layer bonded to an outer surface of the belt, the improvement comprising a coating layer on said fabric layer of a composition containing 70 to 100 phr of a zinc salt unsaturated carboxylic acid ester grafted hydrogenated nitrile butadiene elastomer, zero to 30 phr of a hydrogenated acrylonitrile butadiene rubber, a curing agent for said elastomer and from 5 to 60 phr of PTFE in the form of fibers, powder and mixtures thereof, dispersed throughout said composition.

2. The power transmission belt of claim 1 wherein from 15 to 40 phr of PTFE is used.

3. The power transmission belt of claim 2 wherein PTFE powder is used.

4. The power transmission belt of claim 2 wherein PTFE fiber is used.

5. The power transmission belt of claim 1 wherein from 10 to 50 phr of a conductive carbon black is present in the composition.

6. The power transmission belt of claim 1 wherein the composition additionally comprises a solid lubricant selected from the group consisting of molybdenum disulfide, molybdenum diselenide, graphite, antimony trioxide, tungsten disulfide, talc, mica, tungsten diselenide and mixtures thereof.

7. The power transmission belt of claim 4 wherein from 1 to 25 phr of the solid lubricant is present.

8. The power transmission belt of claim 6 wherein the solid lubricant is molybdenum disulfide.

9. The power transmission belt of claim 6 wherein the solid lubricant is graphite.

10. The power transmission belt of claim 1 which additionally comprises an outer fabric layer which is bonded to a non-drive surface of the belt.

11. The power transmission belt of claim 10 which additionally comprises a coating layer on said outer fabric layer of a composition containing a zinc salt unsaturated carboxylic acid ester grafted hydrogenated nitrile butadiene elastomer, a curing agent for said elastomer and from 5 to 60 phr of PTFE dispersed throughout said composition.

12. The power transmission belt of claim 1 wherein said coating composition is present on said fabric in an amount ranging from 0.05 to 1 kg/m$^2$.

13. The power transmission belt of claim 12 wherein said coating composition is present on said outer fabric in an amount ranging from 0.1 to 0.5 kg/m$^2$.

14. The power transmission belt of claim 1 wherein a peroxide containing curing agent is present.

15. The power transmission belt of claim 14 wherein said peroxide containing curing agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate, n-butyl-4,4-bis(t-butyl peroxy) valerate, $\alpha,\alpha'$-bis(t-butylperoxy)-isopropylbenzene, 2,5-Dimethyl-2,5-di(t-butylperoxy) hexane, Di-t-butyl peroxide, 2,5-Dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di(benzoylperoxy)-hexane, benzoyl peroxide and mixtures thereof.

16. The power transmission belt of claim 1 having three driving surfaces.

17. The power transmission belt of claim 1 having one driving surface.

* * * * *